United States Patent [19]
Foster et al.

[11] Patent Number: 5,863,332
[45] Date of Patent: Jan. 26, 1999

[54] FLUID JET IMPREGNATING AND COATING DEVICE WITH THICKNESS CONTROL CAPABILITY

[75] Inventors: Elizabeth Foster, Friendsville, Pa.; Jeffrey Curtis Hedrick, Park Ridge, N.J.; Robert Maynard Japp, Vestal, N.Y.; Kostas Papathomas, Endicott, N.Y.; Stephen Leo Tisdale, Endwell, N.Y.; Alfred Viehbeck, Austin, Tex.

[73] Assignee: International Business Machines Corporation, Armonk, N.Y.

[21] Appl. No.: 770,058

[22] Filed: Dec. 19, 1996

Related U.S. Application Data

[63] Continuation of Ser. No. 523,969, Sep. 6, 1995, Pat. No. 5,725,668.
[51] Int. Cl.⁶ ........................................ B05C 5/04
[52] U.S. Cl. .................. 118/314; 118/411; 118/315; 118/325; 118/DIG. 11; 118/413; 118/677; 118/679
[58] Field of Search ........................ 118/313, 314, 118/325, 410, 411, 413, 414, 677, 679, 683, 684, 315

[56] References Cited

U.S. PATENT DOCUMENTS

| | | |
|---|---|---|
| 4,142,010 | 2/1979 | Pipkin et al. . |
| 4,174,261 | 11/1979 | Pellegrino . |
| 4,203,257 | 5/1980 | Jamison et al. . |
| 4,299,186 | 11/1981 | Pipkin et al. . |
| 4,387,124 | 6/1983 | Pipkin et al. . |
| 4,836,133 | 6/1989 | Wohrle et al. . |
| 5,037,284 | 8/1991 | Angell, Jr. et al. ..................... 425/112 |
| 5,063,951 | 11/1991 | Bard et al. . |
| 5,192,394 | 3/1993 | Bard et al. . |
| 5,289,639 | 3/1994 | Bard et al. . |
| 5,538,754 | 7/1996 | Sandock ................................... 427/96 |

*Primary Examiner*—Peter Chin
*Assistant Examiner*—Steven B. Leavitt
*Attorney, Agent, or Firm*—Daniel P. Morris

[57] ABSTRACT

The invention involves a fluid treatment device and fluid treatment method to solution or melt coat or impregnate a resin or polymer to a predetermined, metered thickness into a substrate. The invention is effective in impregnating or coating various substrates in both a continuous or batch process on one side, two sides, or in the case of a porous substrate, penetration and complete saturation is possible. The invention offers significant advantages and benefits over existing methods and equipment and allows the coating or impregnation process to be performed at lower cost and higher efficiency with increased environmental safety.

3 Claims, 5 Drawing Sheets

FLUID JET IMPREGNATING AND COATING DEVICE WITH THICKNESS CONTROL CAPABILITY

This is a continuation of application Ser. No. 08/523,969, filed Sep. 6, 1995, now U.S. Pat. No. 5,725,668.

CROSS REFERENCE TO RELATED APPLICATIONS

U.S. application Ser. No. 08/523,881, filed on Sep. 6, 1995, entitled "Fluid Jet Impregnation", to E. Foster et al. is incorporated herein by reference.

U.S. application Ser. No. 08/770,067, filed on the same day herewith, entitled "Expandable Fluid Treatment Device For Tubular Surface Treatments", E. Foster et al. is incorporated herein by reference.

TECHNICAL FIELD

The invention describes a fluid jet device capable of coating or impregnating a controlled thickness of fluid onto a substrate.

BACKGROUND OF THE INVENTION

The application of a fluid, resin or polymer solvent solution or resin or polymer hot melt to a substrate is commonly accomplished by techniques such as spin coating, curtain coating, spray coating, solution impregnation, melt impregnation, etc. These techniques are effective in coating or impregnating the substrate; however, there are typically significant amounts of chemical contaminants (e.g., pollutants) released into the environment during processing. Moreover, many of these processes are inefficient and result in a substantial amount of chemical waste which must be recovered and disposed of properly. For example, the technique of spin coating a thin film dielectric (i.e., polymer) onto a substrate (i.e., silicon wafer) results in 90–95% of the polymer solution spun off and wasted during processing. Significant cost savings could be realized by a controlled means of applying polymer solutions.

Various devices designed for treatment of substrates and similar articles are known in the art, with examples being shown and described in U.S. Pat. No. 4,142,010 (D. J. Pipkin et al.), U.S. Pat. No. 4,299,186 (D J. Pipkin et al.), U.S. Pat. No. 4,387,124 (D. J. Pipkin et al.), U.S. Pat. No. 4,836,133 (A. Wohrle et al.), U.S. Pat. No. 5,289,639 (Bard et al.), U.S. Pat. No. 5,192,394 (Bard et al.), and U.S. Pat. No. 5,063,951 (Bard et al.). The devices referenced in the aforementioned patents, however, do not possess the unique features of the fluid jet impregnating and coating device described herein. It is believed that a fluid treatment device possessing the advantageous features cited herein and otherwise discernible from the teachings provided below constitutes a significant advancement in the art.

SUMMARY OF THE INVENTION

Objects

The primary object of the present invention is to enhance the art of fluid impregnation devices.

It is another object of the invention to provide a fluid treatment device capable of applying fluids to a substrate with relative precision and in a facile manner.

It is another object of the invention to provide a fluid treatment device capable of controlling the thickness of the fluid on the substrate with high precision and accuracy.

It is still another object of the present invention to provide such a device which operates in a relatively simplistic manner and which can be produced relatively inexpensively.

In accordance with one aspect of the invention, there is defined a device for applying fluid to a substrate, the device including at least one head member which includes therein means for directing a first fluid at an established first pressure against the substrate and means for directing a second fluid at an established second pressure (at a location of fluid intersection) against the substrate such that the first fluid impingement on the substrate is limited to a predetermined location. The head member contains a means for controlling the thickness of the material disposed on the substrate.

An additional aspect of the invention includes a fluid treatment device consisting of two parallel head members with at least one row, preferably an array of several rows, of fluid jet injectors. A substrate is transported between the parallel head members in a direction which is substantially parallel to an axis associated with the apparatus surface, extending from the entrance edge to the exit edge, with the row(s) of fluid jet injectors aligned transversely to this axis. In one case the substrate, during its transport, is saturated with a resin/polymer solution or hot melt expelled from the fluid jet injectors. Simultaneously, the pressure is reduced on the opposite side of the substrate by mechanical means thus creating a pressure differential; this facilitates penetration of the resin/polymer solution or hot melt and allows for the collection, degassing and recycling of the resin/polymer. Overflow of the resin/polymer solution or hot melt is controlled by variation of the fluid jet injectors and the applied pressure differential. In a second case, during transport, the substrate is saturated with a resin/polymer solution or melt expelled from parallel fluid injectors with substantially equal pressures. In both cases, final thickness of the resin/polymer solution or melt is controlled by metering rollers internal or external to the parallel fluid injector plates.

DETAILED DESCRIPTION OF THE INVENTION

Figure 1:
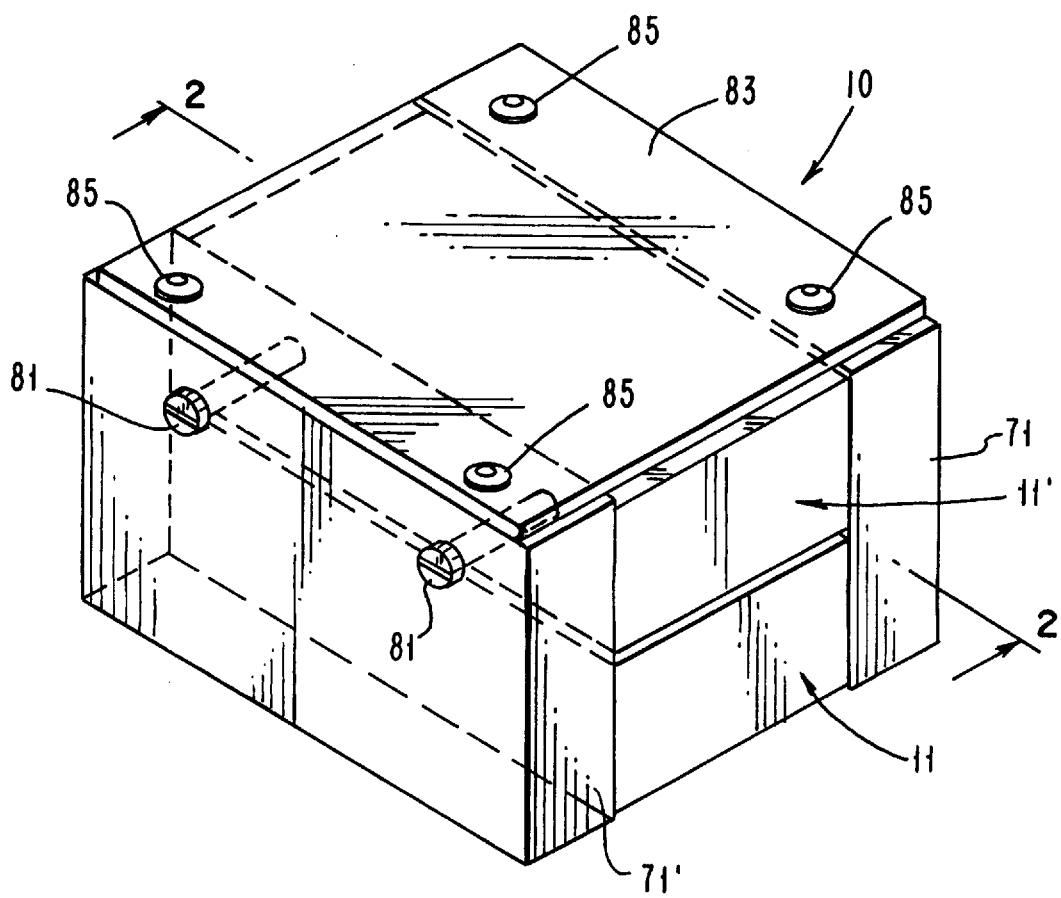
FIG. 1 is a perspective view of a fluid jet coating/impregnation/metering device in accordance with one aspect of the invention.

For a better understanding of the present invention, together with other and further objects, advantages and capabilities thereof, reference is made to the following disclosure and appended claims in connection with the above described drawings.

As described herein, the present invention is designed for applying a fluid to a substrate in such a manner so as to direct such fluid to a predetermined and precisely defined thickness on the substrate. Accordingly, the term fluid as used herein to describe the capability of the invention is meant to include both liquids (e.g., a solvent solution or hot melt of a resin or polymer, as well as aqueous solutions and suspensions, etc.) and gases (e.g., nitrogen, air, etc.). Further, the term substrate as used herein is meant to include any sheet-like rigid or flexible, porous or nonporous material such as a reinforcement (e.g., woven fabric, compressed mat, film, single or bundle of fiber(s)) or article (laminate, circuit board, thin card) composed of organics (e.g., polymers, plastics), inorganics (e.g., ceramics), metals, carbon, glass, etc.

The invention utilizes a head member (e.g, chamber) wherein two fluids are directed such that one functions to substantially limit the impingement of the other to a defined and predetermined location on the substrate. The invention thus utilizes two fluids at two pressures to provide relatively precise fluid application. In addition, the invention provides a means to achieve precise control of thickness of said coating of impregnated fluid. Accordingly, since such fluid control is realized, it is possible to limit exposure of the fluid to the external environment thus substantially limiting release of chemical contaminants (e.g., pollutants). This is advantageous from both an environmental perspective and also in protecting operators from potentially harmful chemical exposure. Furthermore, precise fluid control allows for processing using smaller volumes and recycling of the fluids, thus reducing chemical waste and the need to dispose of the chemical waste, thus reducing processing costs.

As defined herein, the invention is effective in impregnating or coating various substrates in both a continuous or batch process on one side, two sides, or in the case of a porous substrate, penetration and complete saturation is possible. The invention, as understood operates in a relatively simple manner and, additionally, is relatively inexpensive to manufacture. The invention is capable, for example, of producing prepreg, thin film coatings, multi-layer polymer and dielectric layer depositions, photoresist apply applications, paint applications, antireflective coating applications, lubrication coatings, electrostatic discharge coatings, encapsulation coatings to provide corrosion or moisture resistance barriers, etc.

In FIGS. 1–5, there is shown a coating/impregnation device 10 in accordance with a preferred embodiment of the invention. As understood from the following, the invention is capable of applying fluids to a substrate while effecting relatively high mass transfer rates to a desired area thereon and while substantially limiting the interaction with the external atmosphere. Most significantly, the device as taught herein insures relatively precise impingement of the fluid to a selected area of the substrate, such precision deemed essential in the manufacture of various products such as prepregs, printed circuit boards, etc. for microelectronic packages and structural articles such as those utilized in the fabrication of aircraft. Accordingly, the invention as defined herein is particularly adapted for use in such manufacture and particularly wherein such manufacture involves the use of epoxy resins or the like as the primary treatment fluid. The invention is not limited to epoxy resins, however, in that other fluids may be readily utilized using the present invention. This invention is thus considered to represent a significant advancement in the art of resin impregnation and coating devices.

Device 10 comprises at least one head member 11 which includes therein means 13 for directing a first fluid 15 (represented by the solid arrows in FIG. 2) of an established first pressure against a first, predetermined location 17 located on a substrate 19 positioned within device 10. In one embodiment of the invention, first fluid 15 is an epoxy resin solution in methyl ethyl ketone (MEK) and is applied against a location 17 on a woven glass cloth substrate 19. The epoxy resin is utilized to coat the glass substrate 19 before subsequently being employed as a printed circuit board material.

As stated, device 10 is capable of treating other types of substrate materials, including organics (e.g., polymers, plastics, polyimides), inorganics (e.g., ceramics), metals, glass, carbon, etc. or any combination thereof. Furthermore, the substrate can be in the form of a woven fabric, compressed mat, single filament fiber toe, thin film sheet, laminate, circuit board, etc. Thus, the invention is not limited to a particular type of fluid or substrate.

Figure 2:
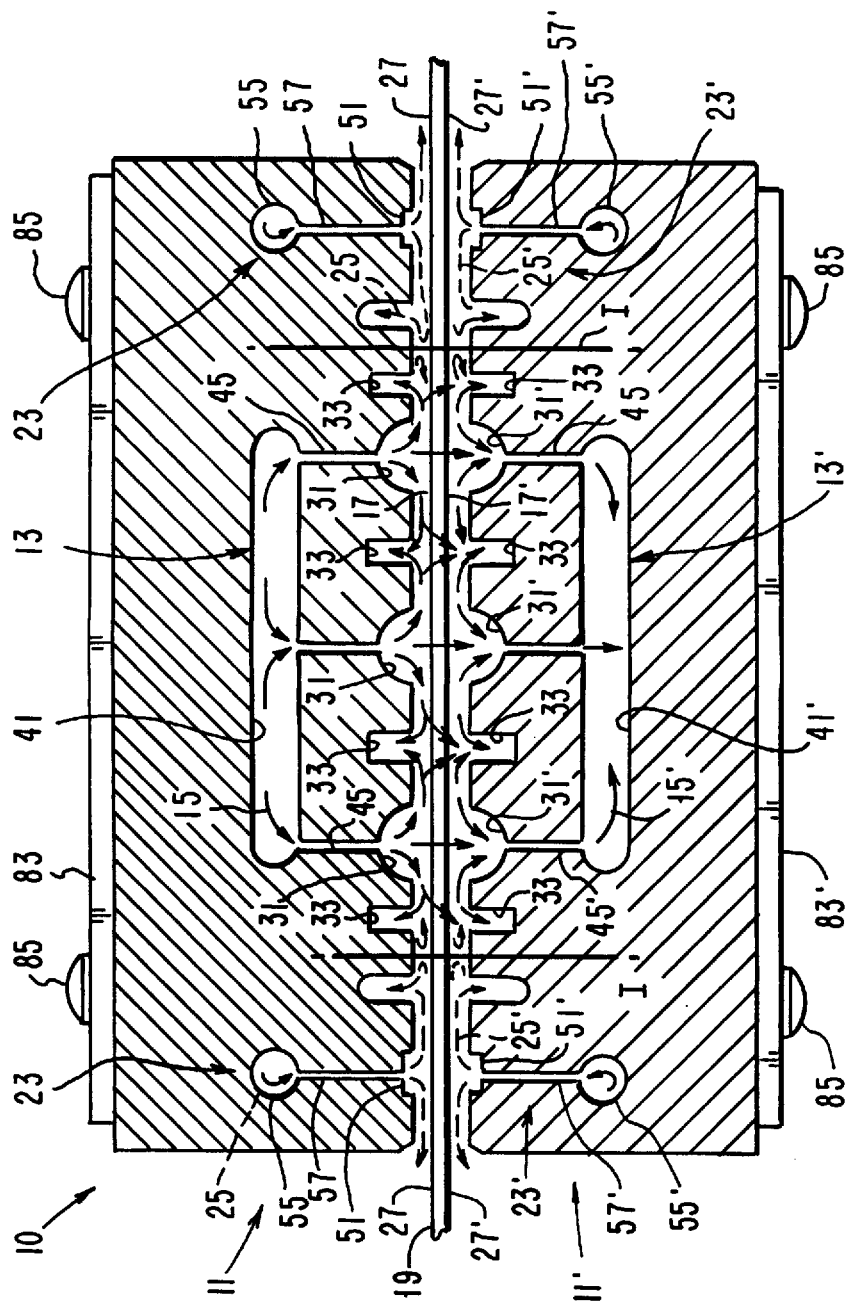
FIG. 2 is a side, elevational view, partly in section, of the fluid coating/impregnation device of FIG. 1 as taken along the line 2—2 in FIG. 1.

In the above example, the substrate 19 possesses an overall width (dimension W in FIG. 3) of about 70 inches and a thickness (dimension T in FIG. 3) of only about 0.001 inch. Substrates having thicknesses ranging preferably from about 0.0005 inch to about 0.5 inch may be successfully treated using the invention. As shown in FIG. 2, head member 11 further includes means 23 for directing a second fluid 25 (represented by the dashed arrows in FIG. 2) of an established second pressure substantially equal to or greater than the pressure of the first fluid 15, this second fluid 25 being directed to a predetermined location 27 on substrate 19 adjacent the first fluid location 17 which receives application of fluid 15. As seen in FIG. 2, the means for applying second fluid 25 directs this fluid at opposite ends of the substrate's first location. Such application of the second fluid serves to substantially limit application of first fluid 15 to impingement substantially only on location 17, and at the approximate central area of the device 10.

In one example of the invention (that using the aforementioned epoxy resin solution), nitrogen is the preferred fluid for the second fluid 25. As stated, the second fluid is at a pressure equal to or greater than the first fluid pressure to thus assure impingement of the first fluid to the desired location.

As stated, device 10 comprises at least one head member 11 which includes therein means R1 for metering the thickness of first fluid 15 (that being the aforementioned epoxy resin solution) to extremely fine tolerances. Means R1 is capable of being adjusted from a remote location to a predetermined position dependent upon the substrate 19.

In another example of the invention, means R1 would be controlled separately from R1' so as to provide variations of thickness of first fluid 15 and 15' from one side of the substrate to the other. First fluid 15 may also be different from first fluid 15' in some instances. Means R1 and R1' are preferably metering rollers. They can also be doctor blades.

Device 10 is capable of treating substrates located therein wherein the substrate is either moving at an established rate or established in a fixed position relative to the device's structure. In the situation wherein substrate 19 is moving, the first fluid 15 will strike the surface adjacent head 11 substantially along the entirety thereof. However, the invention assures that such fluid application will only occur for a predetermined time to the location (17) illustrated in FIG. 2, thus assuring that the desired time periods for exposure to the particular fluids being applied will occur. Such time periods may of course be readily adjusted by corresponding adjustment to the substrate's rate of movement.

Preferably, device 10 has two head members, the second head member being represented by the numeral 11' in the drawings. Further, head 11' may be of identical configuration to that of the upper head 11 shown in FIG. 2. Thus, similar numerals will be used to identify similar structures. However, this is not to limit the invention, in that the second head may be of a different internal configuration while still achieving the proposed desire, that being to provide two fluid heads to provide precise fluid impingement is also provided by the lower head member (11'). The second head member also includes means 13' and 23' for directing fluids 15' and 25', respectively as well as R1' for metering fluid 15'. This arrangement (two heads) is particularly desired to enhance fluid penetration and "wetting" of the substrate. Since some substrates can possess a relatively porous configuration (having apertures or the like therethrough), it is advantageous to have means 13' under reduced pressure (e.g., vacuum) to direct fluid 15 through substrate 19 as shown in FIG. 2. Means 23', however, still remains under positive pressure directing fluid 25' in the direction shown in FIG. 2. This is advantageous to maintain the substrate at a spaced location (as shown in FIG. 2) and to substantially limit application of fluid 15 to impingement substantially only on location 17, and at the approximate central area of device 10.

Figure 3:
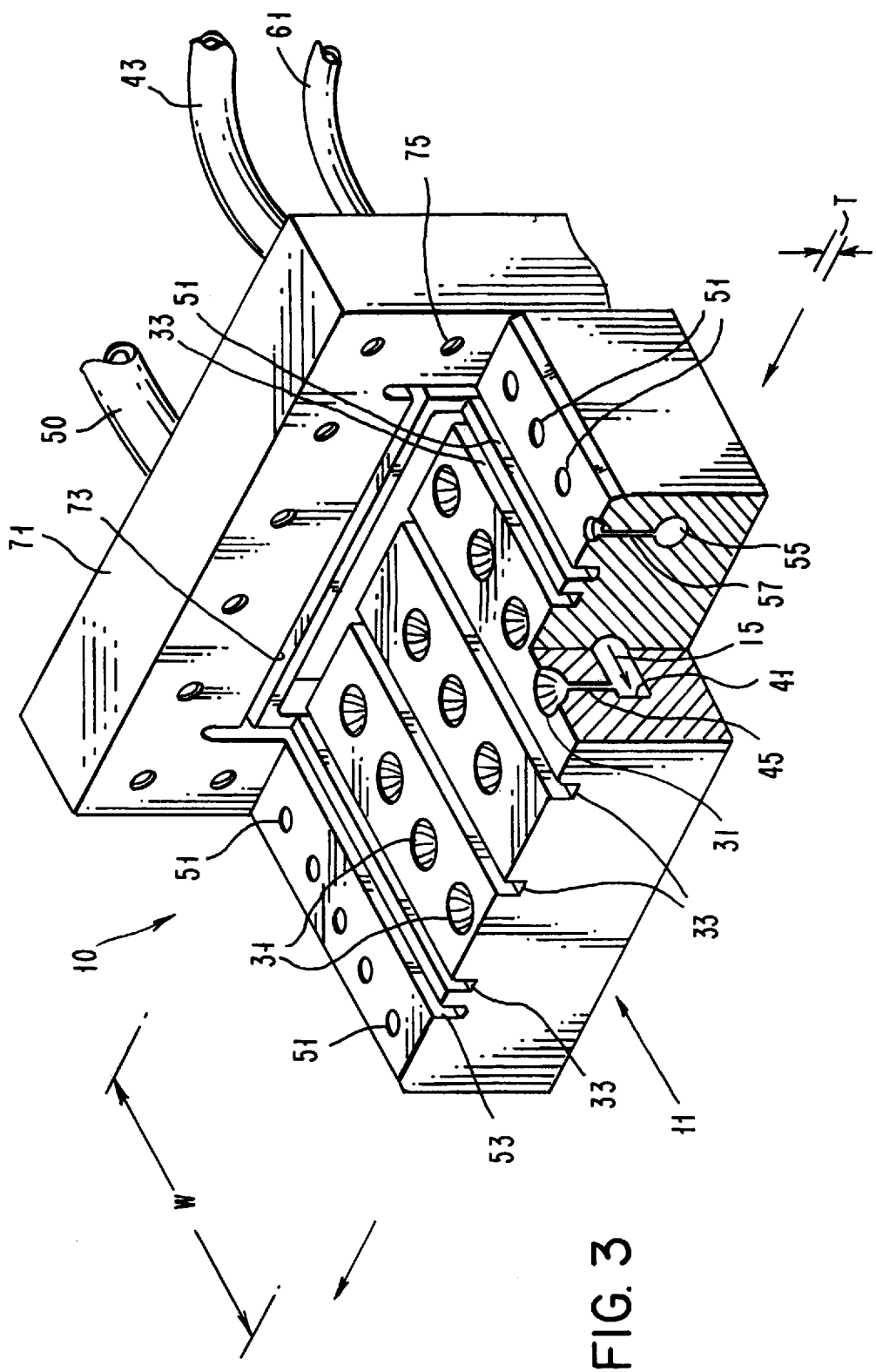
FIG. 3 is a perspective view, on a slightly reduced scale, of the coating/impregnation/metering device of FIGS. 1 and 2, illustrating only one of the possible head members for use therein.

Means 13 for directing first fluid 15 comprises at least one inlet port 31 positioned within head member 11 and at least one outlet port 33 located relative to the inlet port. As seen in FIGS. 2 and 3, means 13 includes curvilinear side walls, said configurations deemed most appropriate for effective flow of fluids such as resins or the like in order to direct said fluids onto the adjacent substrate in the most effective manner. Significantly, the respective outlet ports 33 number only four, each one being located adjacent and with respect to a singular row of inlet ports 31. As seen in FIGS. 2 and 3, each outlet port is of a elongated configuration and thus constitutes a groove or slot within the head members upper surface. It has also been determined that linear (straight) sidewalls for these outlet ports provide the most effective means of fluid escape at this location, although these sidewalls may possess other configurations (e.g., curvilinear, tapered) and still provide effective fluid escape. Also depicted in FIGS. 2 and 3 are means R1 for metering the thickness of fluid 15 onto substrate 19.

The first fluid 15 is preferably supplied to a common chamber 41 located in the head member from a common inlet tube 43 or the like connected to this common chamber. Fluid 15 is further passed through narrow passages 45 between the ports and common chamber to each of the respective curvilinear inlet ports. Withdrawal of fluid 15 after application to substrate 19 is accomplished by passage of this fluid completely through the elongated grooves 33, or mainly through substrate 19 and only slightly through the elongated grooves 33 which are preferably connected to a common duct (not shown) or the like whereupon these pass through an outlet tube 50 or the like. Tube 50 may in turn be connected to a recirculation means including a degassing mechanism, a pump and a viscosity controller. It is of course also possible to provide appropriate fluid treatments (e.g., filters, etc.) as part of this recirculation means.

It is understood that when two head members are utilized, the corresponding inlet and outlet ports for the remaining head member (e.g., 11') will be similarly connected to common outlet tubing, such as 43 and 50 as shown in FIG. 3; however, these being under reduced pressure (e.g., vacuum) to facilitate resin penetration and excessive removal on the one case, or similar inlet and outlet pressures in the other.

As stated, fluid treatment device 10 maintains the treated substrate at the above cited spaced location from the respective head members during fluid application. This relatively narrow gap thus formed between product and the head member, coupled with high fluid rates of flow, in turn thus results in relatively high mass transfer and enhanced deposition/impregnation rates for the invention. Understandably, the invention is thus readily adaptable to mass production techniques. Significantly, the device as described above thus assures capture of the first fluids as utilized herein to thus enable recycling thereof if desired. Such recapture serves to reduce the cost of manufacture associated with using the invention. Equally significant, because the respective second fluids serve to assist in such capture, any potentially harmful materials (e.g., pollutants) are thus contained with in the system.

It is understood that the maintaining of substrate 19 at the spaced distance from the head member's external surface results in a fluid bearing being formed along the surface, the substrate thus riding on said bearing during location within (including movement through) device 10 during fluid application.

Each of the means 23 and 23' for directing second fluid 25 and 25' comprises at least one inlet port 51 and 51' and a corresponding outlet port 53 and 53' located relative thereto. As shown in FIGS. 2 and 3, a plurality (e.g., ten) of such inlet ports 51 are utilized for each head member, these inlet ports being arranged in two singular rows of five each (FIG. 3). The second fluid 25 is supplied to each of these rows of inlet ports through a common channel 55 (or 55' in the case of head member 11'), which fluid then passes upwardly or downwardly within the head through narrow passages 57 and 57' to the respective inlet ports. Each inlet port, as shown, includes substantially linear (straight) sidewalls, as do each of the corresponding outlet ports 53. As shown in FIG. 3, these outlet ports are preferably in the shape of an elongated channel of substantially similar configuration (excluding the lower surface thereof) to the adjacent outlet ports 33 for means 13. Thus, a total of only two such outlet ports 53 (or channels) for the second means 23 is provided within each head member. Each of the common inlet chamber 55 is in turn coupled to a common inlet tube 61 (FIG. 2a), which tube is in turn connected to the suitable source (e.g., pump). Each of the outlet channels 53 are in turn preferably connected to a exhaust tube (not shown) or the like in order to achieve effective venting of the second fluid (nitrogen).

As shown in FIG. 2, the locations of the intersection between the respective first and second fluids (represented by the lines I—I in FIG. 2) represent the external periphery for the first location to which the first fluid is applied to substrate 19. When using the fluids, pressures and port configurations cited above, the resulting fluid impingement along these intersection boundaries is of extremely fine resolution. That is, the line of demarcation between both fluids is clearly and precisely defined. Such precision is considered essential in the manufacture of structures such as prepregs, printed circuit boards, etc. and represents one of the highly advantageous features of the invention. As also shown in FIG. 3, device 10 further includes a common manifold 71 located adjacent the respective head members for assisting in receiving and withdrawing the fluids used in device 10. Common manifold 71 preferably includes a common, longitudinal groove 73 or the like to interconnect the described outlet ports 53. Additionally, the common manifold 71 further includes a plurality in inlet ports 75 which are in turn coupled to the respective head member particularly to the common inlet chambers 55 thereof). Although only one such manifold is depicted in FIG. 3, it is understood that additional manifold members may be utilized in the invention to assist in fluid intake and withdrawal. In FIG. 1, for example, a second manifold may in turn be coupled to either or both of the respective head members 11 and 11'. The tubing associated with such manifolds is not shown in FIG. 1.

Figure 4:
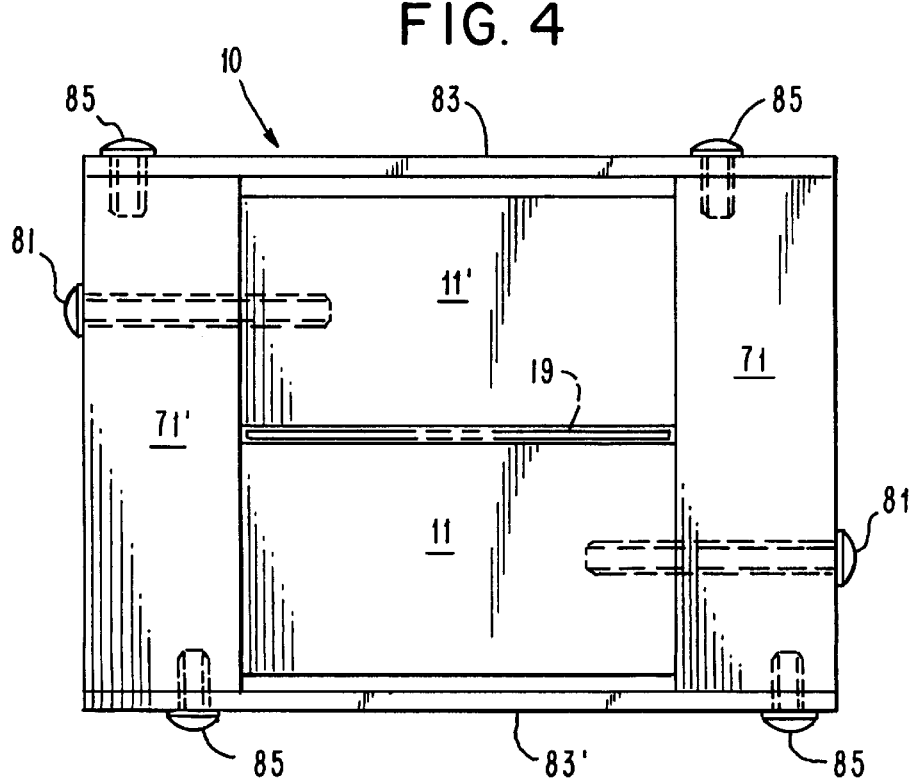
FIG. 4 is a front, elevational view on a slightly enlarged scale, illustrating the relative positioning between the head members of the invention during initial positioning of the substrate being treated therein.
Figure 5:
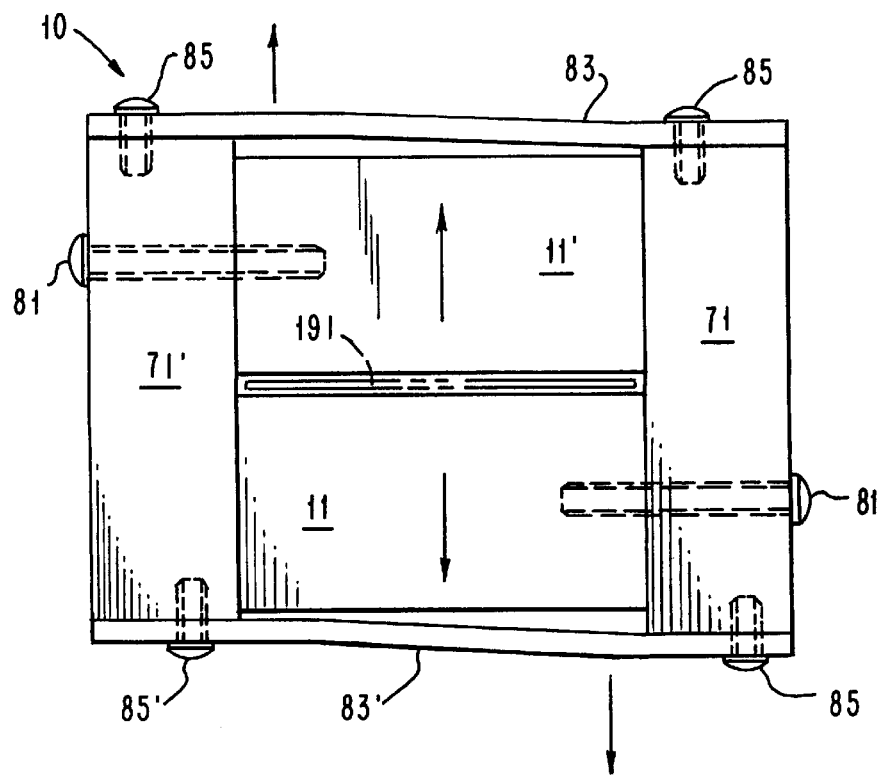
FIG. 5 is a front elevational view, substantially similar to the front elevational view in FIG. 4, illustrating the relative positioning of the head members of the invention during fluid application.

In FIGS. 4 and 5, a relative displacement of the two opposed head members 11 and 11' can be seen. In FIG. 4, each of the head member is shown in its original position prior to fluid application. Substrate 19 (indicated in phantom) is shown between both head members. Although a slight spacing is indicated in FIG. 4, it is understood that the substrate may in fact contact both of the adjacent external head surfaces prior to fluid application. As further shown in FIG. 4, each of the head members is connected (e.g., using screws 81) to a respective one of the adjacent manifold (side support) members 71 and 71'. A minimum of two such screws 81 is used for each respective head member and manifold subassembly (see FIG. 1). Each of these side manifold (side support) members is in turn mechanically connected to the other, opposing manifold member by a pair of bendable plate members 83 and 83'. Screws 85 (four per plate) are used to connect the plate to the upper and lower surfaces of each manifold member.

Thus, it can be seen in FIG. 5 that when fluid is applied, relative movement of both head members 11 and 11' will occur. In FIG. 5, head member 11' moves downwardly while head member 11 moves upwardly relative to the common substrate, which substrate is now located at the aforementioned spaced location from each of the respective head members. It is noted that each of the head members maintains its fixed position relative to the manifold connected thereto, but each such head member is able to move in the opposing manner as shown by virtue of the respective plate members 83 and 83' slightly deflecting (bending) in the manner indicated in FIG. 5. The direction of travel of substrate 19 can be either in the vertical or horizontal direction through head members 11 and 11'.

Figure 6:
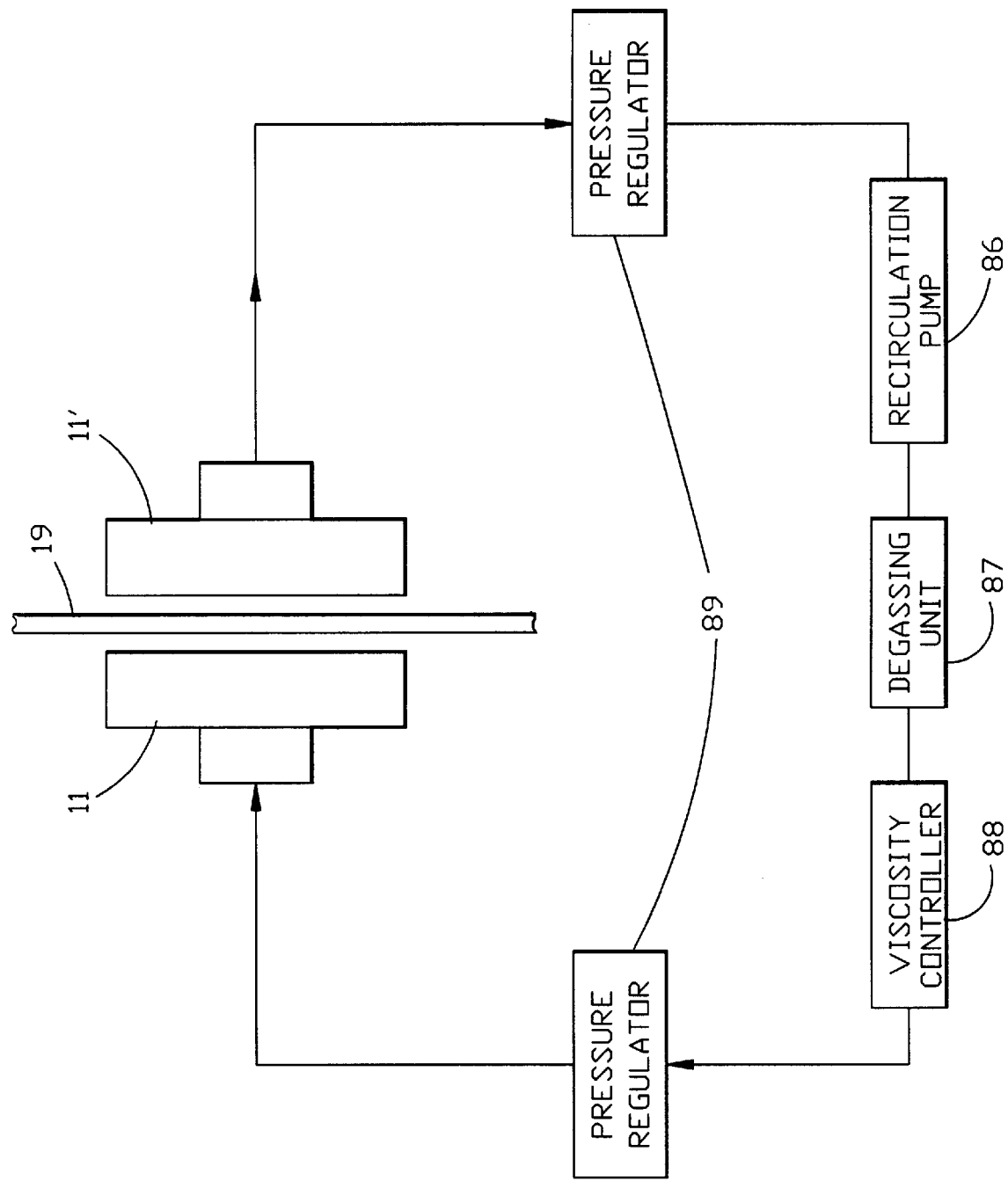
FIG. 6 is a generalized depiction of a fluid jet impregnation device including the head members, recirculation pump, degassing unit, viscosity controller and pressure regulators.

FIG. 6 is a generalized depiction of a fluid jet impregnation device including head members 11 and 11', recirculation pump 86, degassing unit 87, viscosity controller 88 and pressure regulators 89.

Thus there has been shown and described a fluid treatment device possessing the several highly advantageous features cited above. As stated, the device is readily adaptable for use with a variety of fluids, including epoxy resins, bismaleimide resins, cyanate ester resins, acrylic resins, liquid photoresists, aqueous solutions, air, nitrogen, etc. The device as described is of relatively simple construction and can thus be produced at relatively minor costs. Further, the device as described is readily adaptable for use in mass production, thereby even further reducing the cost of manufacture associated therewith.

While the device design described in the aforementioned description of the present invention is preferred, additional device designs described by Bard et al. U.S. Pat. Nos. 5,192,394 and 5,289,639) are also applicable and are hereby incorporated by reference. While there have been shown and described what are at present considered the preferred embodiments of the invention, it will be obvious to those skilled in the art that various changes and modifications may be made therein without departing from the scope of the invention as defined by the appended claims.

We claim:

1. An apparatus for applying fluid to a work piece comprising:

a headmember for coating the work piece, said headmember having an inlet and an outlet for said work piece; a means for applying a first fluid onto said work piece to dispose a layer of said first fluid onto said work piece wherein said work piece has a thickness; a means for applying a second fluid at a pressure substantially equal to or greater than the pressure of the first fluid, before and after the application of said first fluid; a means for controlling said thickness wherein said means for controlling an amount of said first fluid applied to said work piece is selected from the group consisting of a metering roller and a doctor blade wherein aid means for controlling the amount of said first fluid is within said headmember after the application of said first fluid.

2. An apparatus for depositing a controlled thickness a material on a surface comprising:

a fluid head adopted for being disposed adjacent and spaced apart from said surface; said fluid head has a means for applying a first fluid onto said surface to form said material; a means for applying a second fluid at a pressure substantially equal to or greater than the pressure of the first fluid, before and after the application of said first fluid; and a means for controlling the thickness of said first fluid disposed on said surface; said means for controlling is within said fluid head after the application of said first fluid; and said means for controlling is a doctor blade.

3. An apparatus for depositing a controlled thickness a material on a surface comprising:

a fluid head adopted for being disposed adjacent and spaced apart from said surface; said fluid head has a means for applying a first fluid onto said surface to form said material; a means for applying a second fluid at a pressure substantially equal to or greater than the pressure of the first fluid, before and after the application of said first fluid; and a means for controlling the thickness of said first fluid disposed on said surface; said means for controlling is within said fluid head after the application of said first fluid; and said means for controlling is a metering roller.

* * * * *